United States Patent [19]
Wilcox

[11] Patent Number: 6,164,883
[45] Date of Patent: Dec. 26, 2000

[54] RETURNABLE PACKAGING SYSTEM FOR ELONGATED MEMBERS

[75] Inventor: David Wilcox, Elkhart, Ind.

[73] Assignee: White Consolidated Industries, Inc., Cleveland, Ohio

[21] Appl. No.: 09/136,120

[22] Filed: Aug. 18, 1998

[51] Int. Cl.[7] ........................................... B60P 7/12
[52] U.S. Cl. .................. 410/36; 410/32; 410/42; 410/97
[58] Field of Search ................... 410/32, 34–36, 410/42, 96, 97, 117, 118; 206/443; 296/181, 180.4; 220/1.5; 211/49.1

[56] References Cited

U.S. PATENT DOCUMENTS

| | | | |
|---|---|---|---|
| 518,207 | 4/1894 | Cassaday et al. | 410/34 |
| 1,362,282 | 12/1920 | Beadle . | |
| 1,993,216 | 3/1935 | Marshall . | |
| 2,059,390 | 11/1936 | Pagel . | |
| 2,248,119 | 7/1941 | Reed et al. | 410/35 |
| 3,011,852 | 12/1961 | Mahan . | |
| 3,071,283 | 1/1963 | Shelly . | |
| 3,195,723 | 7/1965 | MacDonnell et al. . | |
| 3,537,599 | 11/1970 | Jay . | |
| 4,099,617 | 7/1978 | Nist, Jr. | 410/36 X |
| 5,161,703 | 11/1992 | Patton . | |
| 5,294,222 | 3/1994 | Smith | 410/36 |
| 5,351,827 | 10/1994 | Baka | 410/36 X |
| 5,429,268 | 7/1995 | Hale et al. . | |
| 5,464,141 | 11/1995 | Brindle . | |
| 5,516,244 | 5/1996 | Baka | 410/36 |
| 5,915,899 | 6/1999 | Dennis | 410/36 |

FOREIGN PATENT DOCUMENTS 2259027  8/1975  France .................................. 206/443

*Primary Examiner*—Stephen T. Gordon
*Attorney, Agent, or Firm*—Pearne & Gordon LLP

[57] ABSTRACT

A returnable and reusable packaging and storage system for elongated members, such as awnings. The system includes a container upon which a series of tubular members are stacked. Each tubular member is adapted to slidably receive an elongated member and allows individual elongated members to be removed from the stack of tubular members regardless of their vertical position within the stack. Spacers are attached to the elongated members that are shorter than the tubular member holding the elongated member, so that the combined spacer-elongated members are accessible from either end of the tubular member. The tubular members project in a cantilever fashion from the container, the projecting ends being protected and supported by end bags. The end bags preclude the tubular members, as well as the elongated members therein, from moving longitudinally, and thereby prevent the awnings from sliding out of the tubular members during the shipment and storage thereof.

14 Claims, 3 Drawing Sheets

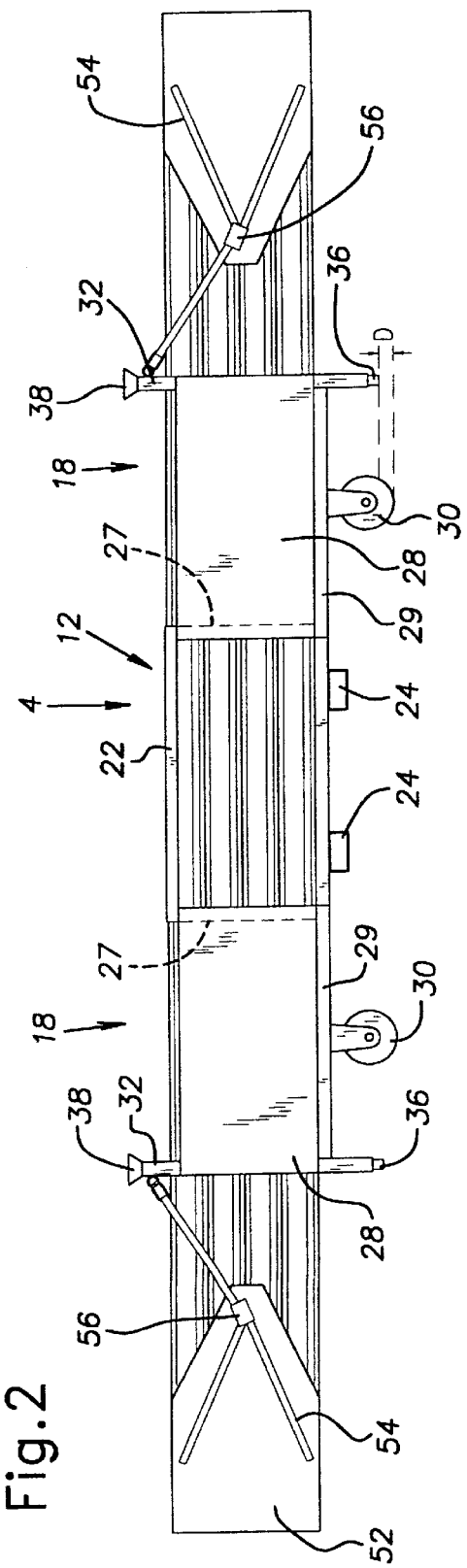
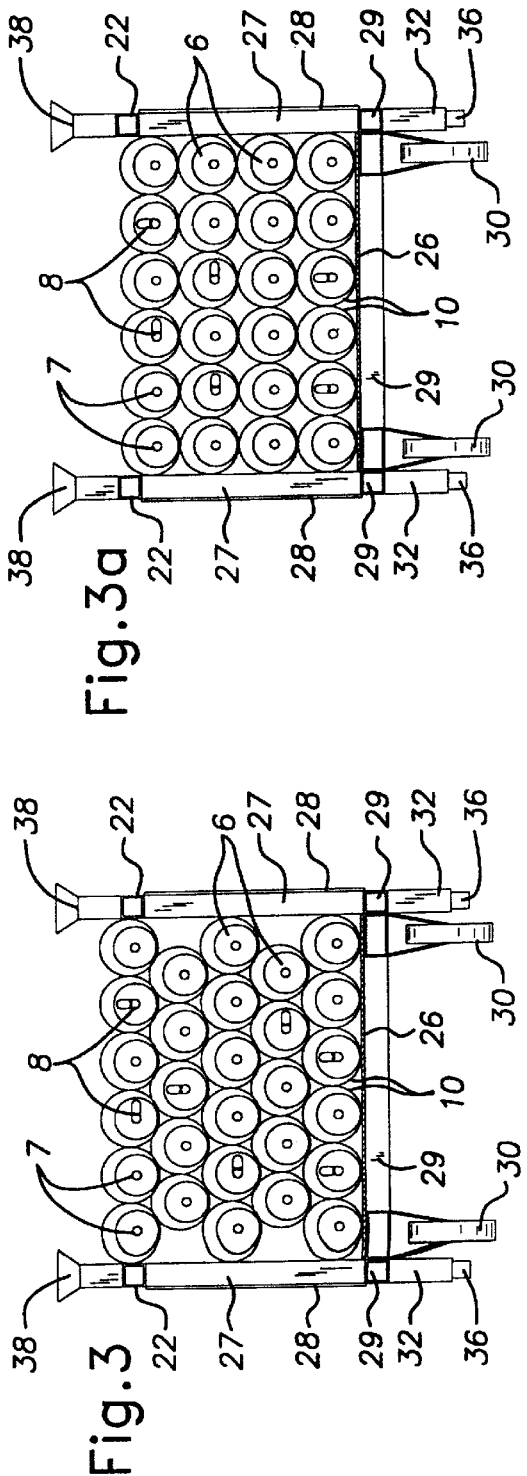
Fig.2
Fig.3a
Fig.3

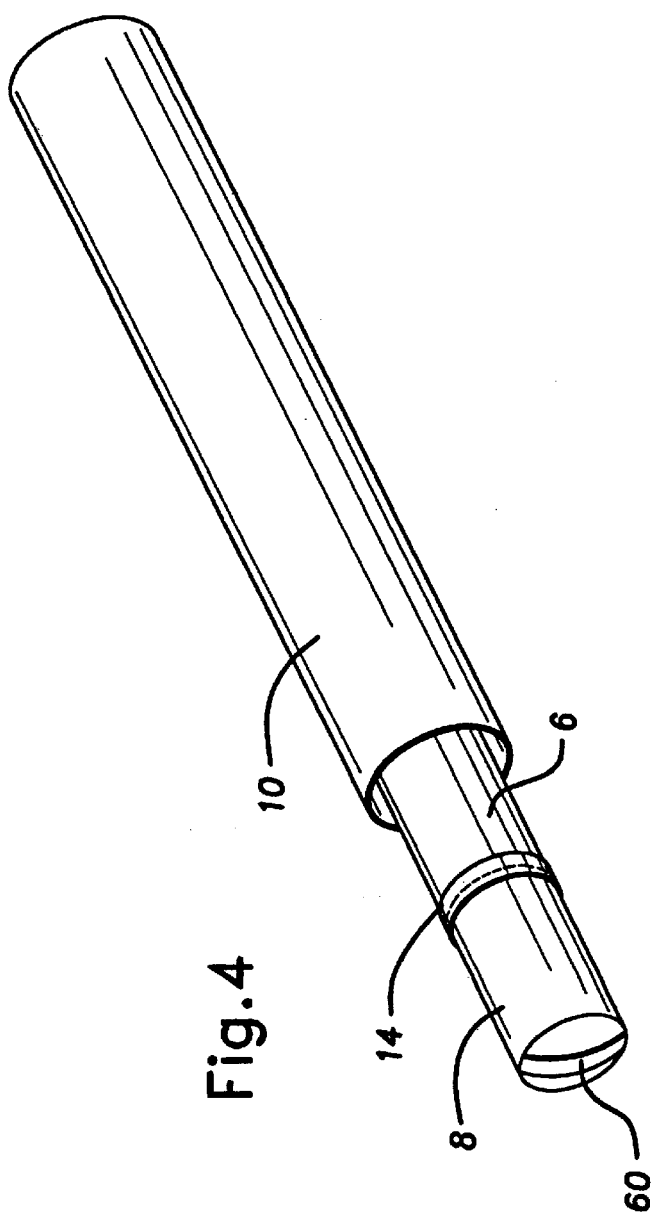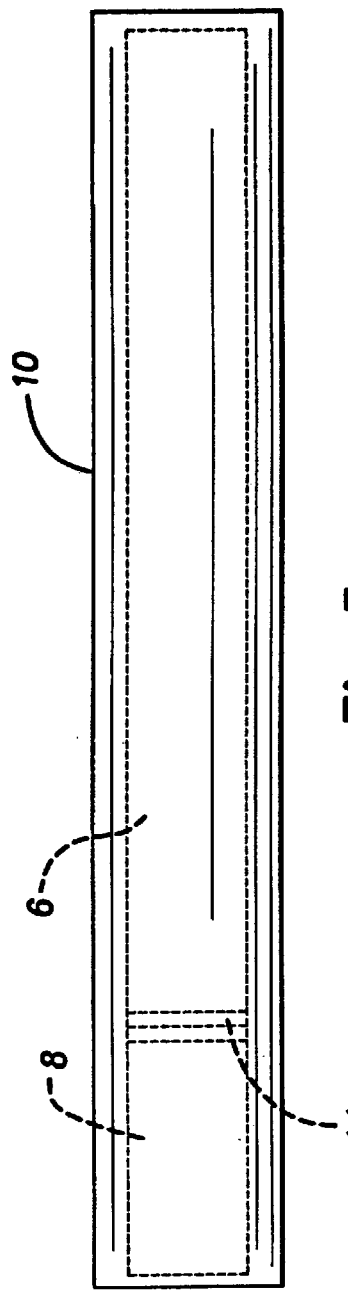

RETURNABLE PACKAGING SYSTEM FOR ELONGATED MEMBERS

BACKGROUND OF INVENTION

1. Field of Invention

The present invention relates to a returnable and reusable packaging and storage system. More specifically, a returnable and reusable carrier for awnings.

2. Description of Related Art

Elongated members are conventionally placed in elongated rigid cardboard tubes to protect them during shipment and storage. Use of cardboard tubes is satisfactory, in most instances, but outdoor storage can degrade the cardboard tubes and poses a risk of product damage. Degraded tubes must be disposed ot, which creates a disposal problem for the retailer. Additionally, replacement of degraded tubes represents a significant expense to the elongated member manufacturer.

Alternatively, elongated members can be placed within a matrix of support plates within a cart. Examples of this technique may be found in U.S. Pat. Nos. 5,516,244 and 5,351,827, each incorporated by reference herein. The plates form channels allowing the elongated members to be stacked without using a cardboard tube.

Since the retailer typically purchases a variety of elongated members having different lengths, the cardboard tubes and the plates present a retrieval problem for the retailer. Namely, when a specific elongated member is desired for purchase or inspection, the tube containing the desired elongated member must be located within the stack of tubes and thereafter manually pulled or otherwise removed from the stack to gain access to the desired elongated member therein. Moreover, the variety of lengths available causes tubes of unequal length to be stacked upon each other, or allows elongated members in uniform length tubes or plates to settle in a region within the tube or plate that cannot be accessed by the retailer. The diameter of the tube may also be too small to retrieve an elongated member by hand. This is not only difficult, but disrupts the order of the remaining shipping tubes and renders inventory control and elongated member retrieval problematic.

Therefore, there exists a need in the art for a returnable and reusable elongated member transport and storage system. There also exists a need in the art for an elongated member storage system which permits easy insertion of elongated members therein and removal of elongated members therefrom.

BRIEF SUMMARY OF INVENTION

The present invention provides a returnable packaging and storage system including a container and a tubular member on the container. The tubular member on the container has a length and is adapted to hold an elongated member. The returnable packaging and storage system also includes a spacer that is adapted to be attached to the elongated member which is substantially shorter than the tubular member holding the elongated member.

In accordance with another aspect of the present invention, a returnable packaging and storage system provides a container having a floor defined by horizontal supports. The floor has a first end, a second end, two sides, and a pair of vertical support members attached to the two sides. The system further provides a tubular member adapted to hold an elongated member placed inside the container. The tubular member has ends and a tubular member length greater than the container length such that the ends are cantilevered over the front end and back end of the container. The system further provides a spacer which is adapted to be slideably inserted into the tubular member, taped to the elongated member and cut to a spacer length such that a combined spacer-elongated member length is substantially equal to the tubular member length. This allows access to the elongated member from either end of the tubular member. The system further provides end bags snugly engaged with the ends of the tubular member. The end bags have a main body portion and a plurality of container-engaging straps. The straps are adjustably attached to the container and the main body protects the ends of the tubular member, generally preventing the tubular member from moving longitudinally.

The floor includes two parallel, longitudinal horizontal support members connected by transverse horizontal support members and the vertical support members extend upwardly from the longitudinal horizontal support members. A pair of longitudinal rails connect upper ends of respective vertical support members. Flat plates are disposed on the horizontal and vertical support members for retaining the tubes. Legs project downwardly from the container and receptacles project upwardly from the container. The legs are adapted for being received in receptacles of another container and the receptacles are adapted for receiving legs of another container therein, the legs and retainers being disposed adjacent respective vertical support members and being inwardly offset from the respective vertical support member.

According to another aspect of the invention, tubular members, which are adapted to receive an elongated member, are stacked on a container. The tubular members each have a tubular member length. A spacer is attached to the elongated member that is substantially shorter than the length of a corresponding tubular member, such that the combined spacer and elongated member length is longer than the tubular member length. The elongated members with attached spacers are slidably inserted into the corresponding tubular member. The spacer is bent at the point where the spacer protrudes from the tubular member.

BRIEF DESCRIPTION OF DRAWINGS

These and further features of the present invention will be apparent with reference to the following description and drawings, wherein:

FIG. 2 is a side elevational view of the returnable packaging system in accordance with the present invention;

FIG. 3 is an end view, with an end cover removed, of the packaging and storage container in accordance with the present invention, with awnings placed therein in an offset manner;

FIG. 3a is an end view, with an end cover removed, of the packaging and storage container in accordance with the present invention with awnings placed therein in vertical alignment;

FIG. 4 is an exploded perspective view of a tubular member, elongated member and spacer in accordance with the present invention;

FIG. 5 is an elevational view of the tubular member in accordance with the preferred embodiment of the present invention, having the spacer and the elongated member therein.

DETAILED DESCRIPTION OF INVENTION

Figure 1:
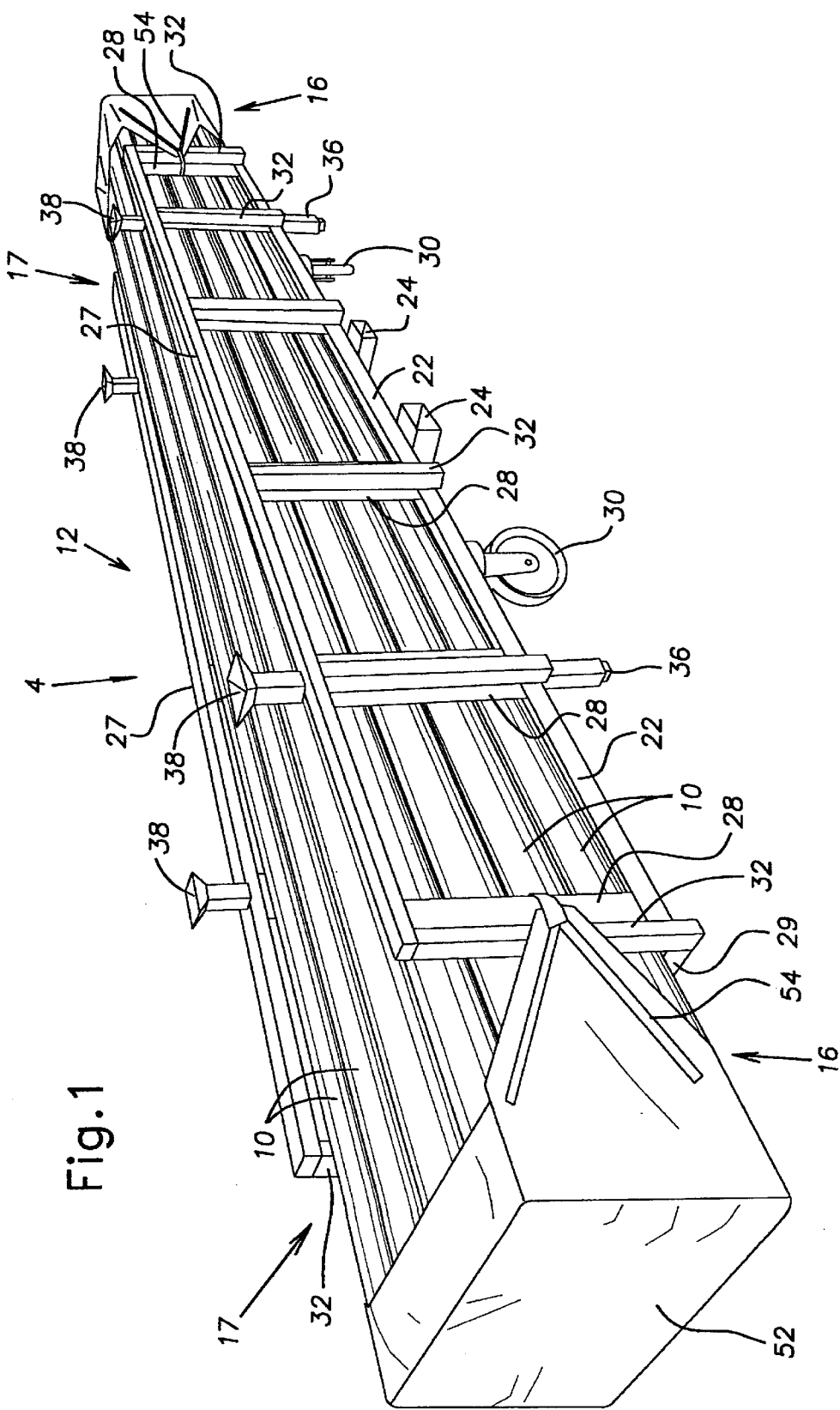
FIG. 1 is a perspective view of a returnable packaging system of the present invention.

With reference to the drawing figures and, in particular, FIGS. 1–5 the present invention provides a returnable packaging storage system 4 adapted to allow the transport and storage of elongated members. Rolled awnings 6 having a factory wound tensioner provide a useful illustration of elongated members used within the present invention, and will be referred to herein. Awnings 6, such as those used on residential and commercial buildings, as well as, travel trailers, mobile homes, motor homes, and the like, are typically comprised of fabric, such as vinyl, canvas or other materials known in the art, which is received in a "C" channel and rolled around a cylindrical roller on axles 7 having a factory wound tensioner. The axles 7 extend longitudinally from ends of the roller. The rolled awnings are typically wrapped or enclosed by a flexible plastic bag, bubble wrap or other protective material to prevent damage to the awnings 6 from liquids and the like.

The awning transport and storage system generally includes a container 12, one or more tubular members 10, a spacer 8, and a pair of protectors or end bags 16. Containers 12 of this type are described in U.S. Pat. Nos. 5,351,827 and 5,516,244, each incorporated herein by reference. The tubular members 10 are supported on the container 12 as shown in FIGS. 2 and 3. As best shown in FIG. 1, the end bags 16 attach near opposite ends of the container 12, and protect and cover ends 17 of the tubular members 10 and their contents, which would otherwise project in an exposed and unprotected manner from the container 12. The end bags 16 also limit axial or longitudinal movement of the tubular members 10 and their contents, as will be described more fully hereafter.

With continued reference to FIGS. 1 and 2, the container 12 includes an open floor defined by horizontal supports. The horizontal supports include a pair of parallel longitudinal members 22 spaced apart by parallel transverse members 29. Preferably, six transverse members 29 are provided. Vertical support members 32 extend upwardly from the longitudinal members 22 at opposite ends of each transverse member 29. A pair of longitudinal rails 27 interconnect upper ends of the vertical supports 32 along respective sides of the container 12. The support members and rails are preferably metal tubes having a square cross-section. Support plates 28 are disposed on the inside face of each longitudinal member 22, longitudinal rail 27, and vertical support member 32. The support plates 28 are preferably 6 inch (15 cm) wide metal plates that provide a smooth support surface. A pair of channels 24 are adapted or arranged to receive forklift forks (not shown) and, preferably, extend across the width of the container 12 to allow a forklift to lift the container from either side. The channels 24 are disposed symmetrically about a central transverse axis of the container. Wheels 30 extend downwardly from the longitudinal supports 22, which is helpful in moving the container when there is no forklift available or when moving with a forklift is not feasible.

Legs 36 extend downwardly from the longitudinal supports 22 at lower ends of four of the vertical supports 36. A lower end of each leg 32 is upwardly spaced a distance D from a bottom of the wheels 30 and therefore spaced a distance D from the ground, bed of a truck, or other surface supporting the wheels. Receptacles 38 extend upwardly from the longitudinal rails 27 at upper ends of the four vertical supports 32 corresponding with the legs 36. The receptacles 38 have enlarged, funnel-like upper terminal sections. The lower terminal section of the leg 36 is adapted to be received within the enlarged upper terminal section 38 of a downwardly adjacent leg in another similar container. Receipt of the lower terminal section 36 by the upper terminal section 38 allows the containers to be vertically stacked which is helpful in shipping and storing multiple containers. The legs 36 are upwardly spaced from the bottom of the wheels 30 to allow the wheels 30 to freely rotate and thereby propel or move the container without interference from the legs 36. The legs 36 and receptacles 38 are inwardly offset about one inch (2.5 cm) from the vertical supports 32. The offset allows spacing of the vertical supports to accommodate five tubular members 10 abreast while maintaining the legs and receptacles at a spacing corresponding to prior containers. Thus, the container of the present invention can be stacked with the containers shown in U.S. Pat. Nos. 5,351,827 and 5,516,244.

Preferably, the overall length of the container 12 is between about 100 inches (254 cm) and about 500 inches (1,270 cm), most preferably the overall length of the container 12 is about 18 feet (5.49 m). Preferably, the container also has a width of about 38 inches (96 cm) and a vertical height of about 40 inches (102 cm). The usable height of the container 12, which is generally equal to the vertical height of the vertical supports 32, is about 27 inches (69 cm).

The container 12 is adapted to receive a plurality of tubular members 10. The tubular members 10 are stacked within the container 12. As best shown in FIGS. 3 and 3a, tubular members 10 are stacked in an offset manner (FIG. 3) or in vertical alignment (FIG. 3a). Each tubular member 10 is load-bearing and adapted to receive an awning 6, and a spacer 8, if a spacer 8 is attached to the awning 6. Awnings 6 are placed within the tubular member 10 for shipment. Preferably, the tubular members 10 are plastic pipes, such as PVC, preferably, black HDP with a minimum thickness of about 0.2 inches (0.5 cm). The length of the tubular members is between about 20 feet (610 cm) and about 24 feet (732 cm). Preferably, the tubular members 10 have a uniform length of 22 feet (671 cm) with an inner diameter of about 6 inches (15 cm). The length of each of the awnings 6 is variable, that is, different awnings may have different lengths. When the awning 6 is substantially shorter than the length of the tubular member 10 it is to be placed in, a spacer 8 is attached to the awning 6. Awnings 6 are substantially shorter than the length of the tubular member 10 when the difference in the lengths is longer than the reach of an arm or the awning 6 would otherwise shift in travel. Attaching a spacer 8 to the awning 6 allows removal of the awning 6 from either end of the container 12.

With reference to FIGS. 3–5, the amount that the spacer 8 protrudes from the tubular member 10 is determined by the length of the rolled awning 6. If an awning 6 is substantially shorter than the tubular member 10 that the awning 6 will be placed in, then a spacer 8 is required. Preferably, the spacer 8 is a predetermined length. The spacer 8 is preferably bent at the point where the spacer protrudes from the tubular member 10, forming a bent portion of the spacer 8 (FIGS. 3 and 5). Alternatively, the spacer 8 is cut to a length such that the combined length of the awning and spacer is approximately or substantially the same as the length of the tubular member 10, preferably this being within one foot of each other, more preferably within four inches of each other. Alternatively, the spacer 8 is fabricated to a predetermined length and matched to an awning 6 that is shorter than the tubular member 10, such that the combined awning-spacer length is approximately or substantially the same as the length of the tubular member 10, as noted above. The spacer is preferably constructed of a rigid material that will not be longitudinally crushed by the awning member during normal shipping conditions. Suitable materials include, for example, plastics, foams, and most preferably, cardboard.

With continued reference to FIGS. 4–5, the spacer 8 is preferably tubular, and is sized and constructed to be attached to the awning 6. Alternatively, the spacer 8 could have other cross sections, such as triangular or square, preferably, corresponding with the cross-section of the elongated member. To make attachment of the spacer 8 to the awning 6 easy, the spacer 8 has a diameter slightly larger than the diameter of the awning axle 7, but smaller than the diameter of the roller. Preferably, the spacer 8 and awning 6 are axially aligned, placed end-to-end with the spacer 8 overlapping the axle 7 and attached to the axle by the use of a fastener, such as tape 14. The resultant configuration is best shown in FIG. 5. Alternatively, the spacer 8 and awning 6 are axially aligned, placed end-to-end without overlapping and the spacer is attached to the roller by the use of a fastener such as tape 14 (FIG. 4). One skilled in the art will appreciate that multiple spacers may be axially aligned and taped together with equivalent results, or an air gap between the spacer and the roller may be present.

Other methods of attaching the spacer include, for example, a spacer 8 that is of a diameter larger than the diameter of the awning 6, such that the spacer 8 slides over the an end of the awning 6 and is then compressively fixed, for example, with tape, rope, cable ties, a belt, or a hose clamp, to the awning 6. In addition, slits may be cut in the spacer to aid the compression fit. A friction fit spacer 8 may be used by constructing the spacer 8 to be slightly larger than the awning 6, such that the awning 6 may be inserted within the spacer 8 creating a friction fit between the spacer 8 and awning 6. Here, no tape is needed. A hook and eye attachment between the spacer 8 and the awning 6, such that the hooks will engage eyes when the awning 6 is removed from either end of the tubular members 10. A spacer 8 adapted to interlock with the awning 6, such as a spacer 8 braided like a Chinese finger puzzle, where the braided spacer 8 tightens around the awning 6 as the spacer 8 is pulled, is also contemplated.

The spacer-awning combination prevents an awning that is shorter than the tubular member 10 from settling into an inaccessible region of the tubular member 10 during shipment. As described more fully below, when the spacer is attached to the awning and placed within the tubular member 10 the awning can be accessed from either end of the container 12.

As best shown in FIG. 5 the spacer-awning combination substantially extends from one end of the tubular member 10 to outside, at or near the other end of the tubular member 10. Oriented in this fashion, the awning 6 is accessible from the tubular member 10 by grasping the spacer 8, the bent portion of which serves as a handle 60. To further facilitate removal of the awning 6 in the alternative embodiments, a handle 60 can be integrally provided with the spacer 8 (FIG. 4). The handle 60 may comprise a separate strap which is attached to the spacer 8 by a fastener, such as tape, glue, screws or the like which is attached to the inner wall of the spacer 8 or the outer wall of the spacer 8. Alternatively, the spacer 8 may be molded so as to include the handle 60, such that the handle 60 and spacer 8 are one piece. In this case, a fastener is not necessary to attach the handle 60 to the spacer 8.

As best shown in FIGS. 4–5, the tubular members 10 are designed to be slightly larger than the spacer 8 and awning 6, allowing the spacer 8 and awning 6 to be slidably movable within the tubular members 10.

The tubular members 10 are vertically stacked on the floor of the container 12. The tubular members 10 typically have a length which is greater than that of the container 12. Therefore, the ends 17 of the tubular members 10 extend or project from the container 12 in an unsupported or cantilever fashion, as illustrated. The projecting or cantilever ends 17 of the tubular members are covered by the pair of awning end bags 16. The end bags 16 limit longitudinal movement of the tubular members, and thereby prevent the spacer 6 and awning 8 from sliding out of the tubular members 10 during transport.

The awning end bags 16 provided by the present invention comprise a fabric main section 52 and a series of straps 54. The straps 54 are provided on opposite sides of the main section 52 and connect to an adjacent vertical leg 32 provided by the container 12. Preferably, the straps 54 are looped over or releasably locked to the vertical legs 32. Typically, ends of the straps 54 will be attached to the legs 32 by the manufacturer or shipper to prevent the end bags 16 from being accidentally misplaced by the retailer. Upon return of the empty container to the manufacturer, the end bags 16 are released or unlocked from the legs to ease re-loading of the container. Length adjustment means 56, such as buckles, are provided on the straps 54 to ensure a close supporting fit between the main section 52 and the tubular member ends 17 and between the main section 52 and the bent portion of the spacer 8. The length adjustment means 56 also allow the end bags 16 to be removed from the tubular member ends 17, and thereby provide access to the tubular members without unlocking the straps 54 from the legs 32.

The main fabric section 52 of the awning end bags 16 is designed and dimensioned to generally match the profile of the cantilever ends 17 of the tubular members 10 and/or a projecting portion of the spacers 8 and, therefore, provides a snug and continuous fit for the awning ends 17. The main section 52, which is preferably made of a durable fabric such as canvas, overlies and encloses the projecting ends 17 of the tubular members, and helps to prevent damage to the awning ends 17 during shipment and subsequent storage. As shown best in FIG. 1, when the extending straps 54 are drawn tight, the end bag 16 engages the cantilever ends 17, and limits or otherwise prevents the tubular members 10 from moving longitudinally.

Use of the aforementioned packaging system will be described hereafter with reference to the foregoing description and drawings. Starting with an empty container 12, a plurality of tubular members 10 are placed on the support plates 28 of the transverse supports 29. The tubular members 10 are positioned and retained between the support plates 28 of the vertical supports 32. The tubular members 10 are positioned adjacent to each other until the floor is covered. The ends 17 of the tubular members extend or project from the container 12 in an unsupported or cantilever fashion. Thereafter, more tubular members 10 are then stacked on top of the existing tubular members in the same fashion. The process is repeated until the container 12 is full. The tubular members 10 can be stacked in at least two ways, including an offset relation to each other (FIG. 3), or arranged in vertical alignment with each other (FIG. 3a).

The stacked tubular members cooperate and support each other. The tubular members 10 are preferably larger in diameter than the spacer 8 and awning 6, thereby allowing any particular awning or spacer to be freely and slidably removed from the array of tubular members within the system.

Once the desired number of awnings 6 are placed in the tubular members 10 on the container 12 and the spacers 8 are attached where necessary, the main section 52 of the awning end bag 16 is fitted or placed over the cantilever ends 17 of the tubular members or over the bent portions of the spacers 8 or over an end of the spacers and the removable straps 54 are attached to the legs 32. The length adjustment means 56 are adjusted to force the main section 52 to cover or enclose the cantilever ends 17 of the tubular members 10, as illustrated in FIG. 1. As stated hereinbefore, the main section 52 covers and protects the ends 17 of the tubular members 10 during shipment and prevents lengthwise or longitudinal movement of the tubular members 10, spacers 8, and awnings 6.

If more than one container 12 is to be shipped or stored, the containers can be vertically stacked upon one another to reduce the floor space required for shipment and storage. One container is lifted, by a forklift or the like, and lowered on a downwardly adjacent supporting container such that the smaller terminal sections 36 of the lifted container legs 32 are received by the enlarged upper terminal section 38 of the lower container legs. The wheels of the lifted container are vertically adjacent or above the tubular members carried by the lower container.

While the preferred embodiment of the present invention is shown and described herein, it is to be understood that the same is not so limited but shall cover and include any and all modifications thereof which fall within the purview of the invention as defined by the claims appended hereto.

What is claimed is:

1. A packaging and storage system comprising:
   a container;
   a tubular member supported by the container, the tubular member having a first end, a second end, and a length and adapted to hold an elongated member having an elongated member length shorter than the tubular member length; and
   a spacer adapted to be axially attached to the elongated member wherein the spacer is axially attached to the elongated member by tape.

2. The packaging and storage system as in claim 1 wherein the spacer is tubular.

3. The packaging and storage system as in claim 1, wherein the length of the spacer is such that the elongated member is accessible from either end of the tubular member.

4. The packaging and storage system as in claim 1, wherein the combined spacer-elongated member has a length substantially equal to the length of the tubular member.

5. The packaging and storage system as in claim 1, wherein the elongated member and the spacer are slideably inserted in the tubular member.

6. The packaging and storage system as in claim 1, wherein the spacer is bent at a point wherein the combined spacer-elongated member has a length substantially equal to the length of the tubular member.

7. The packaging and storage system as in claim 1, wherein the spacer has a handle.

8. The packaging and storage system as in claim 1, wherein the spacer is made of cardboard.

9. The packaging and storage system as in claim 1, wherein the tubular member has a diameter of about 6 inches.

10. The packaging and storage system as in claim 1, wherein the tubular member is dimensioned to allow the elongated member to be slideably removed therefrom and inserted therein without interference from adjacent tubular members.

11. The packaging and storage system as in claim 1, wherein the tubular member is plastic pipes.

12. A packaging and storage system comprising:
    a container;
    a tubular member support by the container, the tubular member having a first end, a second end, and a length wherein the length is longer than the container such that the tubular member is cantilevered at a front end of the container and cantilevered at a back end of the container and the tubular member is adapted to hold an elongated member having an elongated member length shorter than the tubular member length;
    a protector protecting the cantilevered ends of the tubular member; and
    a tubular spacer adapted to be coaxially attached to one of the ends of the elongated member for removing the elongated member from the tubular member.

13. The packaging and storage system as in claim 12, wherein the container has a horizontal support; a left vertical support fixedly attached to the horizontal support; and a right vertical support fixedly attached to the horizontal support, the horizontal support, left vertical support, and right vertical support being adapted to support a stack of tubular members.

14. The packaging and storage system as in claim 12, wherein the protector is an end bag, the bag including a main body portion and a plurality of container-engaging straps, the straps being adjustably attached to the container to allow the main body of the end bag to snugly engage the tubular member, said main body protecting the ends of the tubular member and generally preventing said tubular member from moving longitudinally.

* * * * *